US012743900B2

(12) United States Patent
Hwang et al.

(10) Patent No.: US 12,743,900 B2
(45) Date of Patent: Sep. 22, 2026

(54) METHOD, APPARATUS, AND COMPUTER PROGRAM FOR DETECTING UNAUTHORIZED USE OF BRAND LOGOS

(71) Applicant: S2W INC., Seongnam-si (KR)

(72) Inventors: In Wook Hwang, Seongnam-si (KR); Ki Cheol Kim, Seongnam-si (KR); Keun Tae Park, Seoul (KR)

(73) Assignee: S2W INC., Seongnam-si (KR)

( * ) Notice: Subject to any disclaimer, the term of this patent is extended or adjusted under 35 U.S.C. 154(b) by 377 days.

(21) Appl. No.: 18/528,130

(22) Filed: Dec. 4, 2023

(65) Prior Publication Data

US 2025/0166402 A1 May 22, 2025

(30) Foreign Application Priority Data

Nov. 20, 2023 (KR) ........................ 10-2023-0160410

(51) Int. Cl.
*G06V 20/00* (2022.01)
*G06Q 30/018* (2023.01)
(Continued)

(52) U.S. Cl.
CPC ......... *G06V 20/95* (2022.01); *G06Q 30/0185* (2013.01); *G06V 20/635* (2022.01);
(Continued)

(58) Field of Classification Search
CPC ................. G06V 20/95; G06V 20/635; G06V 30/19093; G06V 30/19147;
(Continued)

(56) References Cited

U.S. PATENT DOCUMENTS 10,755,095 B1 * 8/2020 Cunningham ..... G06Q 30/0185
2021/0056564 A1 * 2/2021 Mossoba ............ G06Q 30/0185
2024/0202645 A1 * 6/2024 Unver .................. G06Q 10/083

OTHER PUBLICATIONS

Vivek Tanniru, et al. "Online Fake Logo Detection System", Research Square, Jan. 20, 2023, https://doi.org/10.21203/rs.3.rs-2492597/v1 (11 pages).

(Continued)

*Primary Examiner* — Phuoc Tran
(74) *Attorney, Agent, or Firm* — USX IP LLC

(57) ABSTRACT

The present disclosure relates to a method, device, and computer program capable of detecting whether a brand logo is illegally being used by an unauthorized person using an image and text of the brand logo. The present disclosure provides a detection technique capable of accurately detecting illegal use of a brand logo even when variously transformed forms and background images are used to avoid legal use detection. According to embodiments of the present disclosure, since the logo identification model can be generated through the machine learning dataset based on the logo transformation images and the image illegal use information can be generated using the logo identification model, it is possible to more accurately detect the illegal use of the logo that is used in variously transformed forms. In addition, since the illegal use information on the logo text can be considered in addition to the logo image, it is possible to further increase the accuracy of the illegal use detection.

11 Claims, 6 Drawing Sheets

(51) Int. Cl.
*G06V 20/62* (2022.01)
*G06V 30/19* (2022.01)

(52) U.S. Cl.
CPC .. *G06V 30/19093* (2022.01); *G06V 30/19147* (2022.01); *G06V 2201/09* (2022.01)

(58) Field of Classification Search
CPC ............. G06V 2201/09; G06V 10/242; G06V 10/761; G06V 10/82; G06V 10/84; G06V 20/62; G06Q 30/0185; G06F 16/3346; G06F 16/5846; G06N 20/00; G06T 3/40
See application file for complete search history.

(56) References Cited

OTHER PUBLICATIONS

AI Hub, "Overseas Trademark Image AI Data", Dec. 31, 2022, (28 Pages).
ByeongHun Kim, "Data augmentation, when training data is scarce", Deeplink Core Lab, May 8, 2023 (9 pages).
Korean Office Action dates Apr. 20, 2024 in Application No. 10-2023-0160410.

* cited by examiner

METHOD, APPARATUS, AND COMPUTER PROGRAM FOR DETECTING UNAUTHORIZED USE OF BRAND LOGOS

CROSS-REFERENCE TO RELATED APPLICATION

This application claims priority to and the benefit of Korean Patent Application No. 2023-0160410, filed on Nov. 20, 2023, the disclosure of which is incorporated herein by reference in its entirety.

BACKGROUND

1. Field of the Invention

The present disclosure relates to a method, device, and computer program capable of detecting whether a brand logo is illegally being used by an unauthorized person using an image and text of the brand logo.

2. Discussion of Related Art

Illegally using logos of famous brands in Internet shopping malls, phishing crimes using phishing sites impersonating logos and marks of public institutions, and the like are occurring. To prevent these issues, techniques of detecting whether brand logos are illegally being used have been researched. However, since variously transformed forms and background images are used to avoid illegal use detection when illegally using brand logos, there may be a problem in that the performance of the illegal use detection may be lowered.

SUMMARY OF THE INVENTION

The present disclosure is directed to providing a detection technique capable of accurately detecting illegal use of a brand logo even when variously transformed forms and background images are used to avoid legal use detection.

Technical problems to be solved by the present disclosure are not limited to the above-described objects, and other technical problems that are not described may be obviously understood by those skilled in the art from the following description.

According to an aspect of the present disclosure, there is provided a brand logo illegal use detection method, including: analyzing a brand logo that is a target of illegal use detection to extract a logo image and logo text; generating logo transformation images including transformed forms of the logo image to generate a machine learning dataset; performing learning based on the machine learning dataset to generate a logo identification model; generating image illegal use information indicating whether an illegal use suspect image in which the logo is suspected to be illegally used includes the logo image by using the logo identification model; performing text analysis on the illegal use suspect image in which the logo is suspected to be illegally used and generating text illegal use information indicating whether the logo text is illegally used; and generating illegal use detection information on the illegal use suspect image based on the image illegal use information and the text illegal use information.

The generating of the machine learning dataset may include: generating the transformed forms based on at least one of rotation, transition, enlargement, reduction, proportion change, color change, brightness adjustment, transparency adjustment, and partial removal of the logo image; and applying a plurality of background images to the transformed forms to generate the logo transformation images.

The generating of the machine learning dataset may further include adding noise text and a noise image to the logo transformation images.

The illegal use suspect image may include a product description image uploaded to an online shopping mall and a phishing image uploaded to a phishing site.

The plurality of background images may include a plurality of product description images uploaded to an online shopping mall and a plurality of public institution images used as a public institution description material.

The image illegal use information may include a probability that the illegal use suspect image includes the logo image, and the text illegal use information may include a probability that the illegal use suspect image includes the logo text.

The generating of the text illegal use information may include: performing optical character recognition (OCR) on the illegal use suspect image to extract illegal use suspect text; and calculating a probability that the illegal use suspect image includes the logo text based on a similarity discrimination result between the illegal use suspect text and the logo text.

The generating of the text illegal use information may include: identifying surrounding text present around the illegal use suspect image and internal text present inside the illegal use suspect image in an online shopping mall or a phishing site; and calculating a probability that the illegal use suspect image includes the logo text based on a similarity discrimination result between the surrounding text and the logo text and a similarity discrimination result between the internal text and the logo text.

The generating of the text illegal use information may include: querying texts associated with the logo text from an associated text pool of the brand logo; and calculating a probability that the illegal use suspect image includes the logo text based on similarity discrimination results between each of the associated texts and the surrounding text and similarity discrimination results between each of the associated texts and the internal text.

The generating of the text illegal use information may include: when the illegal use suspect text is not extracted through the OCR, estimating that the illegal use suspect image includes a designed text; and calculating a similarity between the designed text and the logo image using the logo identification model to calculate the probability that the illegal use suspect image includes the logo text.

According to another aspect of the present invention, there is provided a non-transitory computer-readable recording medium on which a computer program to be executed by at least one processor is recorded, in which the computer program includes instructions for: analyzing a brand logo that is a target of illegal use detection to extract a logo image and logo text; generating logo transformation images including transformed forms of the logo image to generate a machine learning dataset; performing learning based on the machine learning dataset to generate a logo identification model; generating image illegal use information indicating whether an illegal use suspect image in which the logo is suspected to be illegally used includes the logo image by using the logo identification model; performing text analysis on the illegal use suspect image and generating text illegal use information indicating whether the logo text is illegally used; and generating illegal use detection information on the illegal use suspect image based on the image illegal use information and the text illegal use information.

According to still another aspect of the present invention, there is provided a brand logo illegal use detection device, including: a memory configured to store instructions; and a processor configured to execute the instructions to analyze a brand logo that is a target of illegal use detection to extract a logo image and logo text, generate logo transformation images including transformed forms of the logo image to generate a machine learning dataset, perform learning based on the machine learning dataset to generate a logo identification model, generate image illegal use information indicating whether an illegal use suspect image in which the logo is suspected to be illegally used includes the logo image by using a logo identification model, perform text analysis on the illegal use suspect image and generating text illegal use information indicating whether the logo text is illegally used, and generate illegal use detection information on the illegal use suspect image based on the image illegal use information and the text illegal use information.

The solution to the problem of the present disclosure is not limited to the solutions described above, and other solution methods that are not described will be clearly understood by those skilled in the art from the following descriptions.

BRIEF DESCRIPTION OF THE DRAWINGS

The above and other aspects of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present disclosure will be described in detail with reference to the accompanying drawings. The description below is only intended to specify embodiments and is not intended to limit or restrict the scope of rights according to the present disclosure. What a person skilled in the art related to the present disclosure may easily infer from the detailed description and examples of the present invention should be construed as falling within the scope of rights according to the present disclosure. Detailed descriptions of matters widely known to those skilled in the art related to the present disclosure will be omitted.

Terms used in the present disclosure are described as general terms widely used in the technical field related to the present disclosure, but the meaning of the terms used in the present disclosure may vary depending on the intention of the technician working in the art, the emergence of new technology, examination standards, or precedents, etc. Some terms may be arbitrarily selected by the applicant. In this case, the meaning of the arbitrarily selected terms will be described in detail. The terms used in the present disclosure should be construed not only as their dictionary meaning, but also as the meaning that reflects the overall context of the specification.

Figure 1:
FIG. 1 is a diagram illustrating a brand logo illegal use detection system according to some embodiments.

FIG. 1 is a diagram illustrating a brand logo illegal use detection system according to some embodiments.

Referring to FIG. 1, a brand logo illegal use detection system 100 may be illustrated. In the system 100, the brand logo illegal use detection device 120 may receive a brand logo 110 and generate illegal use detection information 130 on the received brand logo 110.

The brand logo 110 may be a target of the illegal use detection. For example, the brand logo 110 may include logos for various products such as clothing, miscellaneous goods, automobiles, and mobile phones, and include logos representing public institutions such as police, prosecutor, and Financial Supervisory Commission.

The illegal use detection device 120 may be configured to detect whether the brand logo 110 is currently being used illegally. For example, the illegal use detection device 120 may query Internet web pages that are newly generated every day and analyze images uploaded to new pages to detect whether illegal use of shopping mall brand logos, phishing impersonating public institutions, etc., occur.

The illegal use detection information 130 may include a web page link where the brand logo 110 is illegally used, a date and time of illegal use, an illegal user, etc. The illegal use detection information 130 may include information on illegal use of a logo image of the brand logo 110 and/or information on illegal use of logo text of the brand logo 110. The illegal use detection information 130 may be provided to an operating subject of the brand logo 110.

Figure 2:
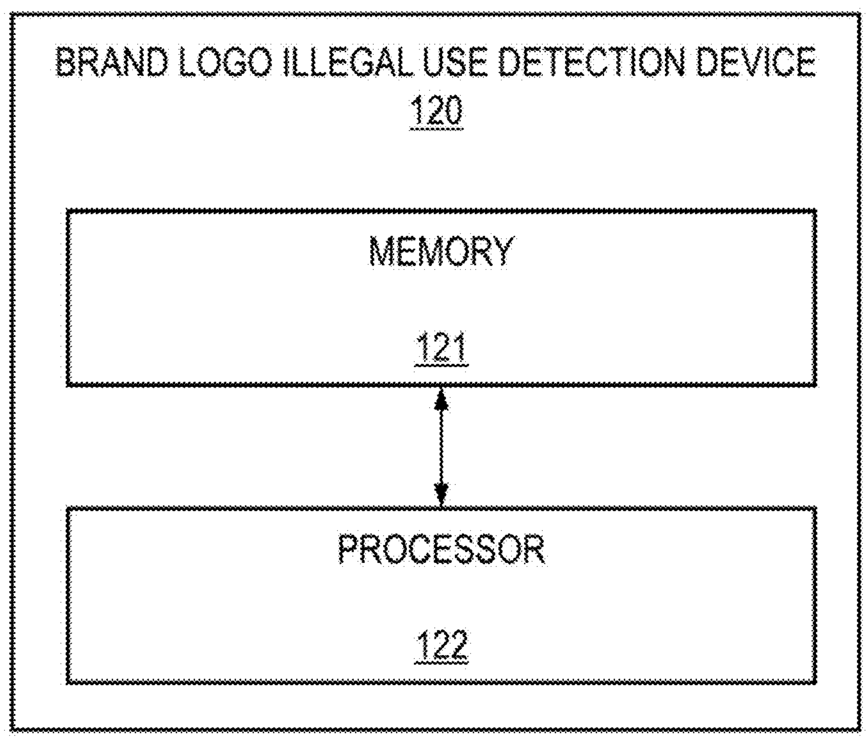
FIG. 2 is a diagram illustrating elements constituting a brand logo illegal use detection device according to some embodiments.

FIG. 2 is a diagram illustrating elements constituting a brand logo illegal use detection device according to some embodiments.

Referring to FIG. 2, the brand logo illegal use detection device 120 may include a memory 121 and a processor 122. However, the present disclosure is not limited thereto, and some configurations may be omitted from the illegal use detection device 120, or other general-purpose configurations may be further included in the illegal use detection device 120.

The memory 121 and the processor 122 may be electrically connected to each other through device-to-device communication. The device-to-device communication method may include a bus, a general purpose input and output (GPIO), a serial peripheral interface (SPI), a mobile industry processor interface (MIPI), etc.

The memory 121 may have a structure for storing various instructions, computer programs, software, mobile applications, or data processed by the illegal use detection device 120. For example, the memory 121 may be implemented as a non-volatile memory such as a read-only memory (ROM), a programmable read-only memory (PROM), an erasable programmable read-only memory (EPROM), an electrically erasable programmable read-only memory (EEPROM), a flash memory, a phase-change random access memory (PRAM), a magnetic random access memory (MRAM), a resistive random access memory (RRAM), and a ferroelectric random access memory (FRAM), or a volatile memory such as dynamic random access memory (DRAM), a static random access memory (SRAM), a synchronous dynamic random access memory (SDRAM), a PRAM, an RRAM, and a ferroelectric random access memory (FeRAM), and may be implemented in the form of a hard disk drive (HDD), a solid state drive (SSD), secure digital (SD), Micro-SD, or the like, or a combination thereof.

The processor 122 may have a structure for performing processing processes required for the operation of the illegal use detection device 120. The processor 122 may be implemented as an array of a plurality of logic gates or a general-purpose microprocessor for processing various operations, and may be configured as a single processor or a plurality of processors. For example, the processor 122 may be implemented in the form of at least one of a microprocessor, a central processing unit (CPU), a graphics processing unit (GPU), and an application processor (AP).

The processor 122 may be configured to execute instructions stored in the memory 121 to analyze the brand logo 110 that is the target of the illegal use detection and extract the logo image and logo text. The brand logo 110 may generally include both an image portion and a text portion. In this case, the logo text may be separated using optical character recognition (OCR) or the like, and thus, and the logo image may be identified. Meanwhile, when the logo text is excessively designed and is not identified by the OCR, etc., the entire designed image may be treated as the logo image and logo text.

By executing instructions stored in the memory 121, the processor 122 may be configured to generate logo transformation images including the transformed forms of the logo image and generate a machine learning dataset. The machine learning dataset may be used as training data to generate a model detecting illegal use of a logo. The machine learning dataset may include a logo transformation image, and each logo transformation image may be an image that has various types of transformations, such as enlargement, reduction, rotation, proportion change, color change, partial removal, and figure addition of the logo image.

By executing instructions stored in the memory 121, the processor 122 may be configured to perform learning based on the machine learning dataset and generate a logo identification model. The logo identification model may include an artificial network model for identifying the brand logo 110 present within an input image. The logo identification model may be trained using the training data set, and the training data set may be the machine learning dataset including the logo transformation image. For example, the logo identification model may be a convolutional neural network (CNN) model.

By executing instructions stored in the memory 121, the processor 122 may be configured to generate image illegal use information indicating whether the logo image is included in an illegal use suspect image using the logo identification model. The illegal use suspect image may include shopping mall images uploaded to new Internet web pages, phishing images impersonating public institutions, etc. The illegal use suspect image may include a logo image portion and a logo text portion, and the logo identification model may generate the image illegal use information indicating whether the logo image portion illegally uses the brand logo 110.

By executing instructions stored in the memory 121, the processor 122 may be configured to perform text analysis on the illegal use suspect image and generate the text illegal use information indicating whether the logo text is illegally used. The illegal use suspect image may include the logo image portion and the logo text portion, and the text illegal use information may be generated to indicate whether the logo text portion illegally uses the logo text of the brand logo 110. For example, the OCR, etc., may be performed to identify the logo text portion of the illegal use suspect image. The OCR may be performed through various models that can be obtained on the market without a separate model generation process.

By executing instructions stored in the memory 121, the processor 122 may be configured to generate the illegal use detection information 130 on the illegal use suspect image based on the image illegal use information and the text illegal use information. For example, the illegal use detection information 130 may indicate that the logo image and/or logo text of the brand logo 110 is illegally used when considering both the image illegal use information and the text illegal use information. The illegal use detection information 130 may include a location of illegal use, a web page link, a date and time of illegal use, an illegal user, etc.

According to an embodiment, when generating the machine learning dataset, the processor 122 may be configured to generate the transformed forms based on at least one of rotation, transition, enlargement, reduction, proportion change, color change, brightness adjustment, transparency adjustment, and partial removal of the logo image, and apply a plurality of background images to the transformed forms to generate the logo transformation images. The transformed forms may include various variations that can be applied in the range in which the brand logo 110 may be seen. Meanwhile, in order to resolve the problem in that the logo identification and the illegal use detection are difficult depending on which background the brand logo 110 is displayed, the plurality of background images may be applied to the transformed forms when the logo transformation images are generated. A plurality of background images may refer to various background screens in which the brand logo 110 may be used.

According to the embodiment, the processor 122 may be configured to add noise text and noise image to the logo transformation images when generating the machine learning dataset. For example, since figures such as dots or lines may be added to avoid the Illegal use detection, the noise text and noise image may be added to the logo transformation images so that the logo identification and illegal use detection can be possible even if such noise exists.

According to the embodiment, when generating the machine learning dataset, not only the logo transformation images, the plurality of background images, and the noise text/image, but also data that users have tagged manually may be used. For example, when a specific subject repeatedly uses the brand logo 110 illegally, if a subject's unique method of forgery and alteration of a logo is obtained, in order to prevent such a forgery and alteration method from being detected, the manual tag data may be added to the machine learning dataset.

According to the embodiment, the illegal use suspect image may include a product description image uploaded to an online shopping mall and a phishing image uploaded to a phishing site. The brand logo 110 for expensive or rare products may frequently be used illegally in shopping malls, such as an open market or a personal SNS account, and the brand logo 110 for public institutions such as police, prosecutor, and Financial Supervisory Commission may be illegally used for the purpose of phishing, etc., on a web page. To detect the illegally used brand logos 110 more efficiently, the illegal use suspect image may include product description images and phishing images.

According to the embodiment, the plurality of background images may include a plurality of product description images uploaded to an online shopping mall and a plurality of public institution images used as a public institution description material. When applying the plurality of background images to the logo transformation image to generate the machine learning dataset, more associated background images may be used to achieve higher identification performance of the logo identification model. In order to better detect the illegal use of the logo for the Internet shopping mall, the product description images may be used as the plurality of background images, and in order to better detect the illegal use of the logo for the phishing impersonating the public institutions, images related to public institution explanatory materials may be used as the plurality of background images.

According to the embodiment, the image illegal use information may include the probability that the illegal use suspect image includes a logo image, and the text illegal use information includes the probability that the illegal use suspect image includes a logo text. The logo identification model may be trained to calculate the probability that the illegal use suspect image includes the logo image. For example, the logo identification model may calculate the logo image related probability based on the number of overlapping images features. Meanwhile, the logo text related probability may be calculated based on the number of matching texts.

According to the embodiment, when generating the text illegal use information, the processor 122 may be configured to perform the OCR for the illegal use suspect image to extract the illegal use suspect text, and calculate the probability that the illegal use suspect image includes the logo text based on a similarity discrimination result between the illegal use suspect text and the logo text. For example, the similarity discrimination may be performed based on an edit distance algorithm, and the probability that the illegal use suspect image includes the logo text may be calculated based on the edit distance between the illegal use suspect text and the logo text of the brand logo 110.

According to the embodiment, when generating the text illegal use information, if the illegal use suspect text is not extracted through the OCR, the processor 122 may be configured to estimate that the illegal use suspect image includes a designed text, and calculate the similarity between the designed text and the logo image using the logo identification model to calculate the probability that the illegal use suspect image includes the logo text. Despite performing the OCR, there may be cases where text is not extracted from the illegal use suspect image, which may mean that the text is designed/transformed to a significant degree and is close to a picture. In order to smoothly perform the logo identification and illegal use detection for this form, the designed image itself may be compared with the logo image of the brand logo 110, and the result may be used as the text illegal use information.

Figure 3:
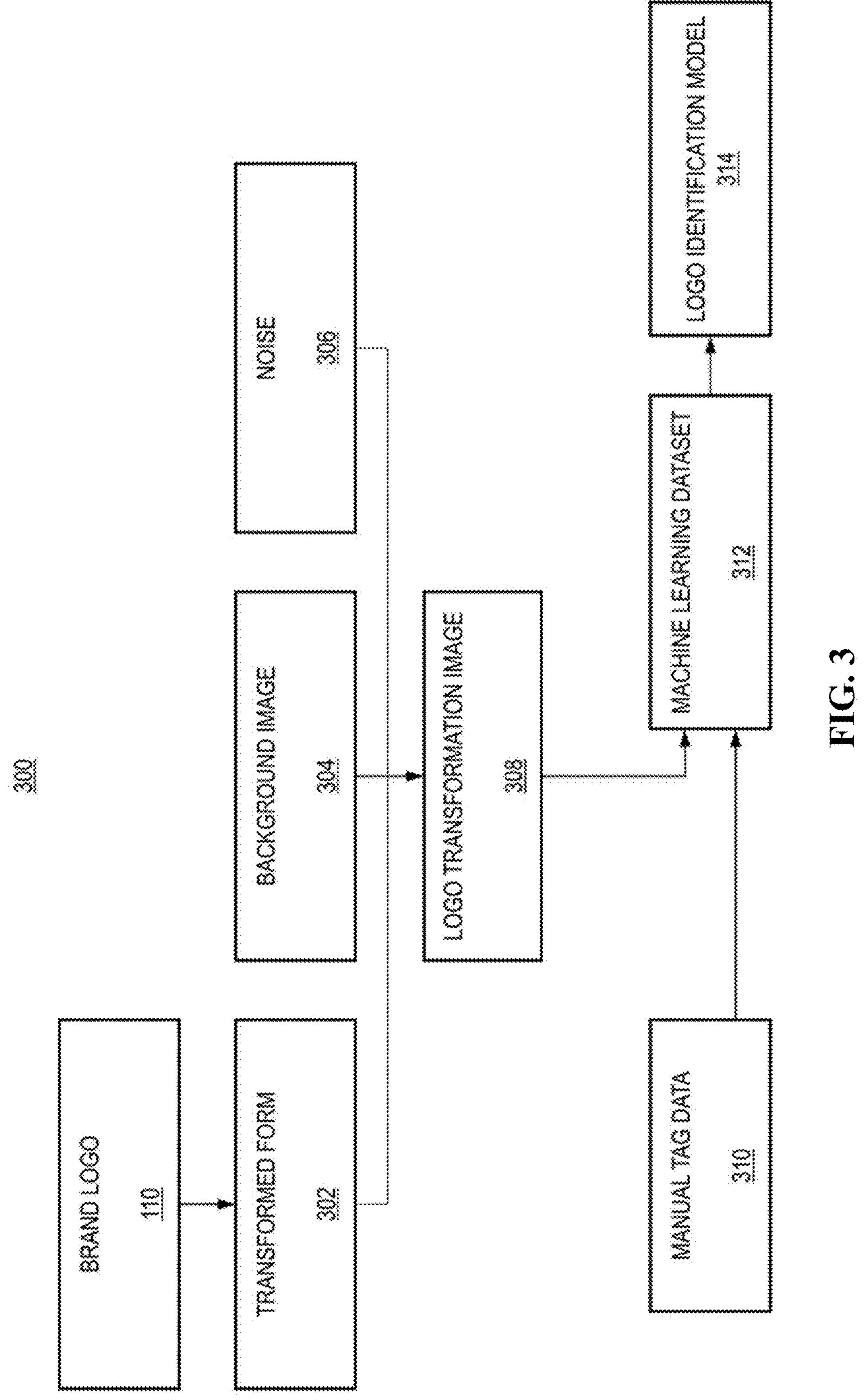
FIG. 3 is a diagram illustrating a process of generating a logo identification model according to some embodiments.

FIG. 3 is a diagram illustrating a process of generating a logo identification model according to some embodiments.

Referring to FIG. 3, a process 300 may be shown illustrating a process of generating a logo identification model 314. Given the brand logo 110 that is the target of the illegal use detection, a corresponding machine learning dataset 312 may be generated, and the logo identification model 314 may be generated through learning using the machine learning dataset 312.

The brand logo 110 may be transformed into variously transformed forms 302. To this end, the rotation, transition, enlargement, reduction, proportion change, color change, brightness adjustment, transparency adjustment, partial removal, or a combination thereof may be performed. A plurality of background images 304 to be combined with the variously transformed forms 302 may be provided. The types of the plurality of background images 304 may be determined in a method of increasing the identification performance of the brand logo 110. To prevent the illegal use detection from being avoided due to the logo forgery or alteration, noise 306 including dots, lines, other figures, or text, etc., may be added to generate logo transformation images 308.

The logo transformation images 308 are composed by the illegal use detection device 120 to improve the performance of the model learning, while the manual tag data 310 may be training data generated by allowing the user of the illegal use detection device 120 to reflect specific information. For example, the manual tag data 310 may be generated based on patterns of an illegal use image/text previously generated by an illegal user of a logo. The machine learning dataset 312 may be generated by adding the manual tag data 310, and the logo identification model 314 may be trained using the generated machine learning dataset 312.

Figure 4:
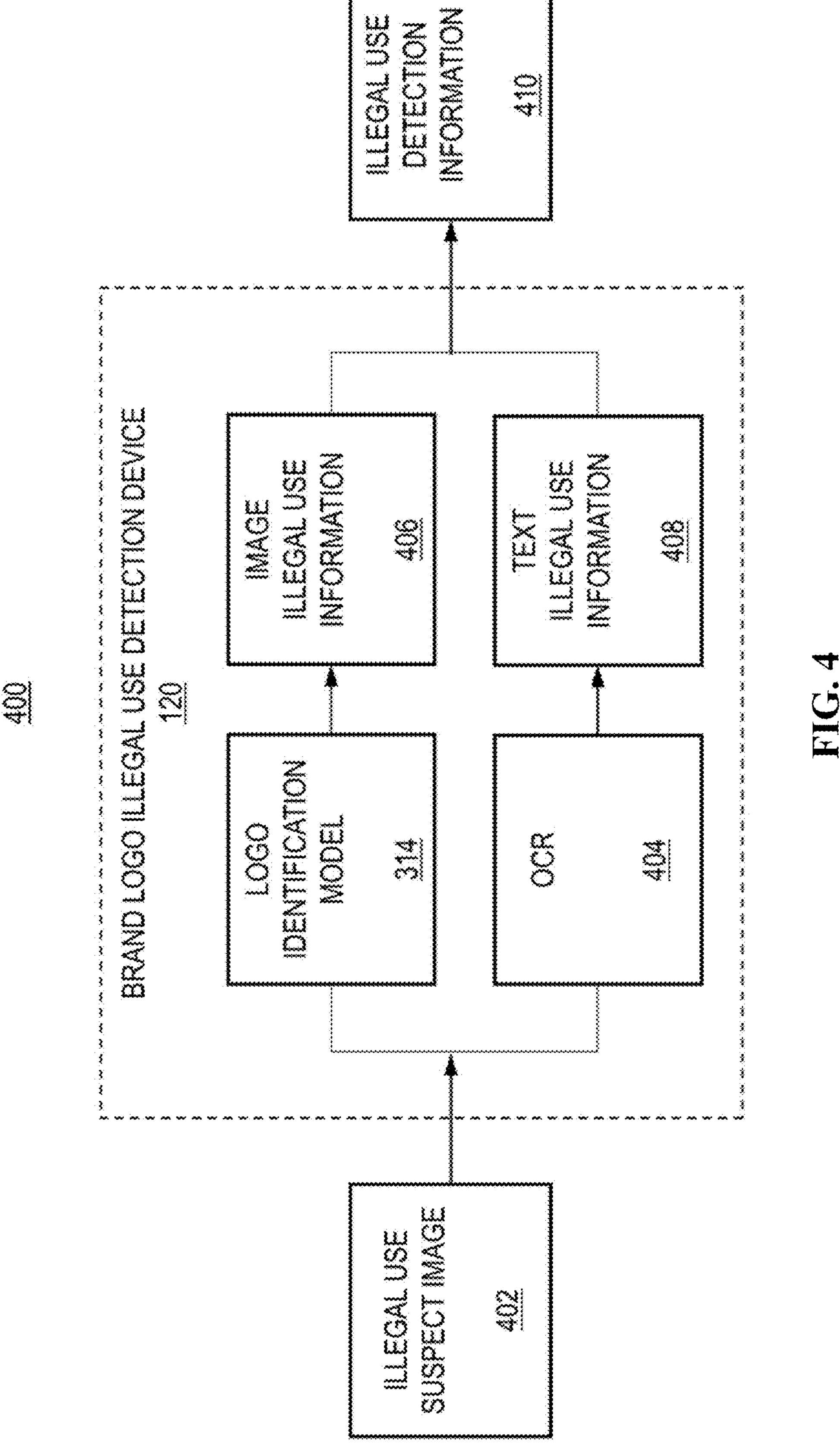
FIG. 4 is a diagram illustrating a process of deriving illegal use detection information based on image illegal use information and text illegal use information according to some embodiments.

FIG. 4 is a diagram illustrating a process of deriving illegal use detection information based on image illegal use information and text illegal use information according to some embodiments.

Referring to FIG. 4, a process 400 of deriving illegal use detection information 410 based on image illegal use information 406 and text illegal use information 408 may be illustrated.

When an illegal use suspect image 402 is given, the illegal use detection device 120 may generate the image illegal use information 406 and the text illegal use information 408 using the logo identification model 314 and OCR 404, and derive illegal use detection information 410 using the generated image illegal use information 406 and text illegal use information 408. For example, the illegal use suspect image 402 may include uploaded images, which are queried periodically, such as once a day or once a week, from new web pages.

The image illegal use information 406 and the text illegal use information 408 may include a probability value that the logo image and logo text of the brand logo 110 are illegally used. For example, the illegal use detection device 120 may compare the illegal use probability value of the logo image with a first threshold, compare the illegal use probability value of the logo text with a second threshold, and derives the illegal use detection information 410 indicating whether the brand logo 110 has been illegally used based on whether the illegal use probability value exceeds the first threshold and/or the illegal use probability value exceeds the second threshold. Alternatively, through the calculation processing of the illegal use probability value of the logo image and the illegal use probability value of the logo text, the illegal use detection information 410 indicating the probability that the brand logo 110 has been illegally used may be finally derived.

According to the embodiment, when generating the text illegal use information, the processor 122 may be configured to identify surrounding text present around the illegal use suspect image 402 and internal text present inside the illegal use suspect image 402 in an online shopping mall or phishing site, and calculate the probability that the illegal use suspect image 402 includes the logo text based on a similarity discrimination result between the surrounding text and the logo text and a similarity discrimination result between the internal text and the logo text. For example, the illegal use suspect image 402 itself uploaded to the online shopping mall or phishing site does not include the logo text of the brand logo 110, but there may be cases where explanatory text of the online shopping mall or phishing site includes the logo text of the brand logo 110. Even in this case, the similarity determination may be performed not only on the internal text but also for surrounding text to detect the illegal use of the logo.

According to the embodiment, when generating the text illegal use information, the processor 122 may be configured to query text associated with the logo text from an associated text pool of the brand logo 110, and calculate the probability that the illegal use suspect image 402 includes the logo text based on similarity determination results between each of the associated texts and the surrounding text and similarity determination results between each of the associated texts and the internal text. For example, an operating subject of the brand logo 110 itself may have a pool of a transformed usage form of the logo text and may provide information on the pool to the illegal use detection device 120. For example, when there are 10 associated texts in the associated text pool, the process of discriminating the similarity between the surrounding text and internal text of one logo text and 10 associated texts may be repeated 11 times. In this way, it is possible to improve the performance of detecting the illegal use of the logo text in the online shopping malls or phishing sites.

Figure 5:
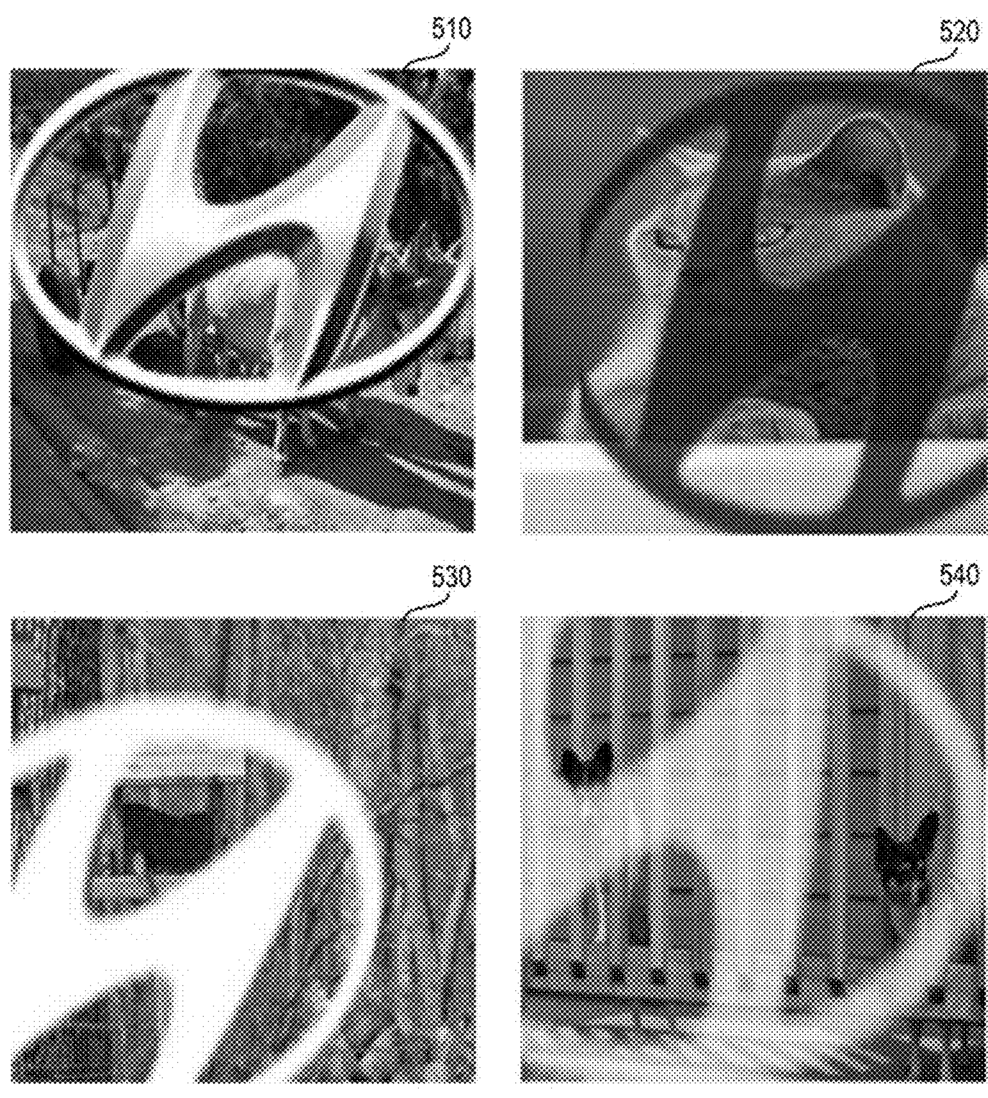
FIG. 5 is a diagram illustrating a process of generating logo transformation images including transformed forms of a logo image according to some embodiments.

FIG. 5 is a diagram illustrating a process of generating logo transformation images including transformed forms of a logo image according to some embodiments.

Referring to FIG. 5, each of the logo transformation images 510, 520, 530, and 540 may include a transformed form of a logo image. It may be confirmed that various background images are applied to the logo transformation images 510, 520, 530, and 540.

The first logo transformation image 510 may show a transformed form in which shading is applied to the logo image of the brand logo 110. The second logo transformation image 520 may show a transformed form in which color change and partial removal of left and right sides are applied to the logo image of the brand logo 110.

The third logo transformation image 530 may show a transformed form in which the color change is applied to the logo image of the brand logo 110, the logo is blurred, and parts of the left and bottom are removed. The fourth logo transformation image 540 may show a transformed form in which the transparency of the logo image of the brand logo 110 is adjusted.

Figure 6:
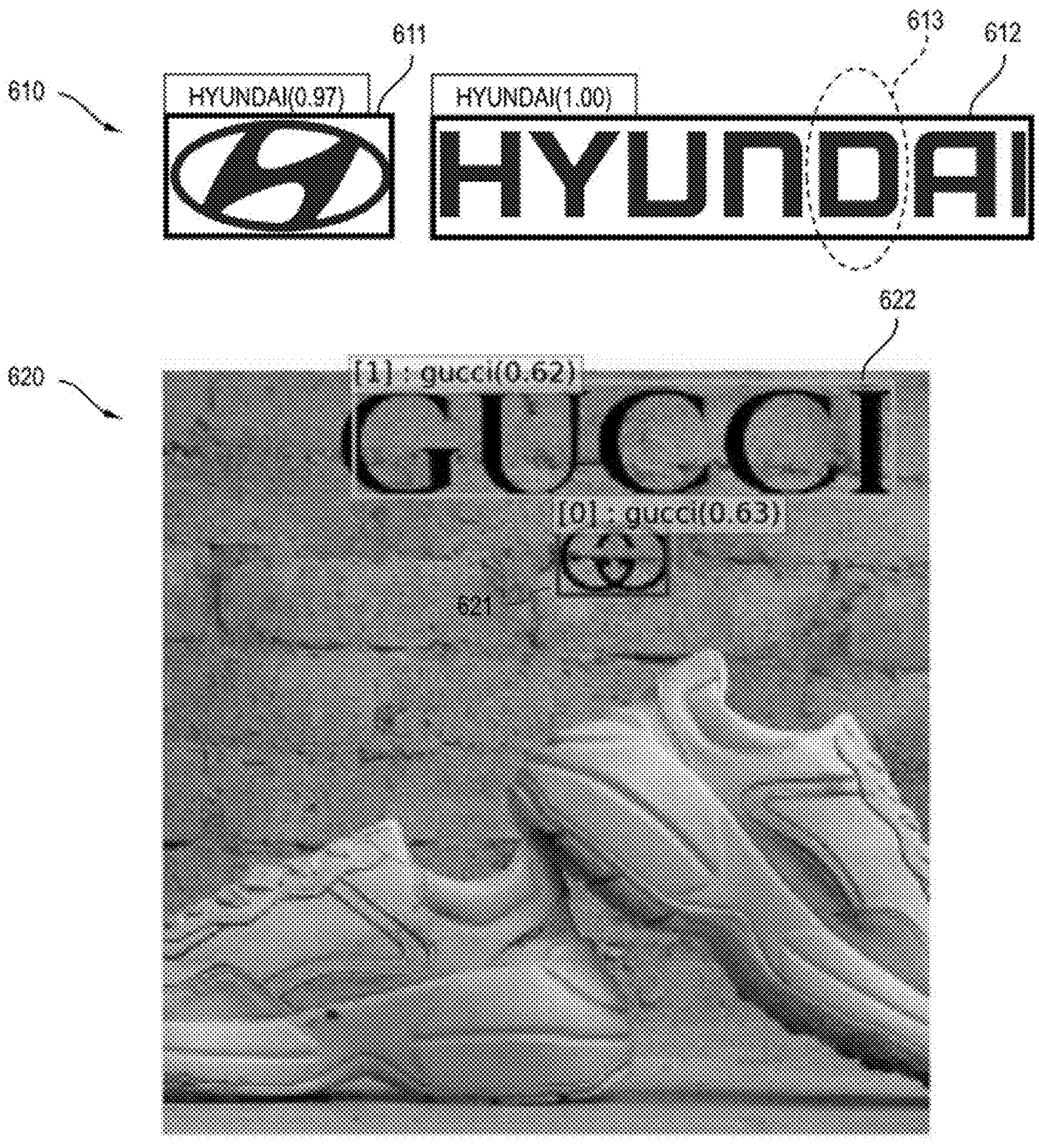
FIG. 6 is a diagram illustrating a method of analyzing image illegal use information and text illegal use information according to some embodiments.

FIG. 6 is a diagram illustrating a method of analyzing image illegal use information and text illegal use information according to some embodiments.

Referring to FIG. 6, a first illegal use suspect image 610 and a second illegal use suspect image 620 may be illustrated. The first illegal use suspect image 610 and the second illegal use suspect image 620 may be queried on online shopping mall web pages, etc.

The first illegal use suspect image 610 may include a logo image portion 611 and a logo text portion 612. Through the logo identification model and OCR, the image illegal use information on the logo image portion 611 and the text illegal use information on the logo text portion 612 may be analyzed. For example, the logo image portion 611 may include the logo image of the brand logo 110 with a probability of 0.97, and the logo text portion 612 may include the logo text of the brand logo 110 with a probability of 1.00.

Meanwhile, the logo text portion 612 may include a misreading notice portion 613. For example, the misreading notice portion 613 is actually 'D', but may be identified as 'O' as a result of the OCR. In this case, even if 'D' is identified as 'O', the similarity determination method may be determined so that the text illegal use information on the logo text portion 612 may provide accurate information on the illegal use of the logo. For example, 'D' and 'O' may be preset to be treated as the same character, or even if there is a difference between 'D' and 'O', the text illegal use determination threshold may be set with some margin so that the logo text portion 612 is determined to correspond to the illegal use.

In a similar manner, the second illegal use suspect image 620 may also include a logo image portion 621 and a logo text portion 622. The probability that the logo image portion 621 includes the logo image of the brand logo 110 and the probability that the logo text portion 622 includes the logo text of the brand logo 110 may be derived, and the illegal use detection information 130 may be finally provided to an illegal use detection requester based on these derived probabilities.

Figure 7:
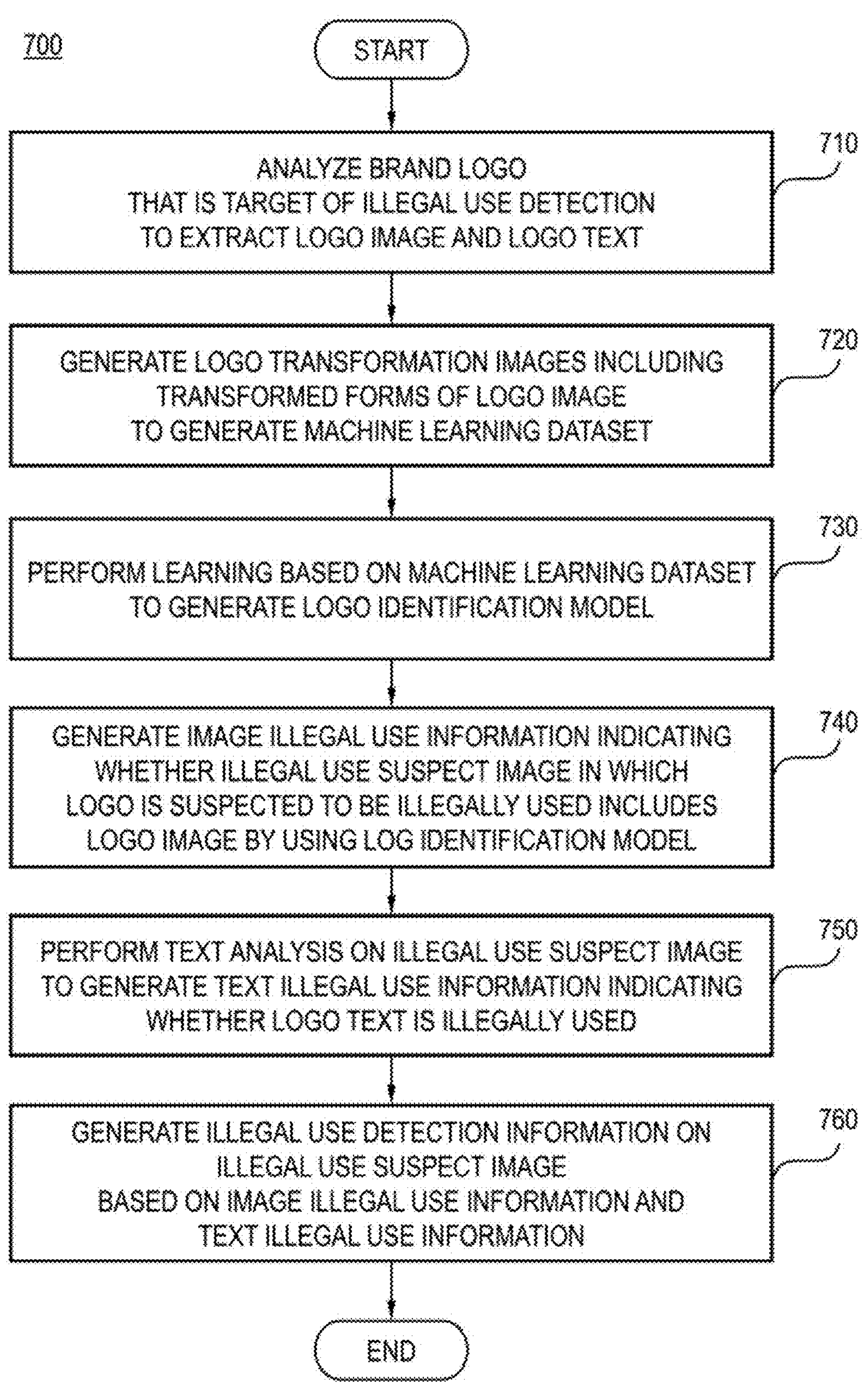
FIG. 7 is a diagram illustrating operations configuring a brand logo illegal use detection method according to some embodiments.

FIG. 7 is a diagram illustrating operations configuring a brand logo illegal use detection method according to some embodiments.

Referring to FIG. 7, a brand logo illegal use detection method 700 may include operations 710 to 760. However, the brand logo illegal use detection method 700 is not limited thereto, some operations may be omitted or other general-purpose operations may be added, and the operations of the brand logo illegal use detection method 700 may be executed in a different order from the order illustrated.

The brand logo illegal use detection method 700 may include operations processed in time series in the brand logo illegal use detection device 120. Therefore, even if the contents are omitted below, the contents described above regarding the brand logo illegal use detection device 120 may be equally applied to the brand logo illegal use detection method 700.

Operations 710 to 760 of the brand logo illegal use detection method 700 may be performed by the memory 121 and the processor 122 of the brand logo illegal use detection device 120.

In operation 710, the brand logo illegal use detection device 120 may analyze the brand logo which is the target of the illegal use detection to extract the logo image and logo text.

In operation 720, the brand logo illegal use detection device 120 may generate the logo transformation images including the transformed forms of the logo image to generate the machine learning dataset.

In operation 730, the brand logo illegal use detection device 120 may perform learning based on the machine learning dataset to generate the logo identification model.

In operation 740, the brand logo illegal use detection device 120 may generate the image illegal use information indicating whether the illegal use suspect image includes the logo image by using the logo identification model.

In operation 750, the brand logo illegal use detection device 120 may perform the text analysis on the illegal use suspect image to generate the text illegal use information indicating whether the logo text is illegally used.

In operation 760, the brand logo illegal use detection device 120 may generate the illegal use detection information on the illegal use suspect image based on the image illegal use information and the text illegal use information.

According to the embodiment, the brand logo illegal use detection method 700 may be implemented in the form of a computer program stored in a computer-readable storage medium. That is, the computer program may include instructions for implementing the brand logo illegal use detection method 700, and the instructions of the program may be stored in the computer-readable storage medium. The computer program may include mobile applications.

According to embodiments, examples of the computer-readable storage medium may include a magnetic medium such as a hard disk, a floppy disk, or a magnetic tape; an optical medium such as a compact disk read only memory (CD-ROM) or a digital versatile disk (DVD), a magneto-optical medium such as a floptical disk, and a hardware device specially configured to store and execute program commands, such as a ROM, a RAM, a flash memory, or the like. The computer program instructions may include a machine language code generated by a compiler and a high-level language code that may be executed by a computer using an interpreter, etc.

According to embodiments of the present disclosure, since a logo identification model can be generated through a machine learning dataset based on logo transformation images and image illegal use information can be generated using the logo identification model, it is possible to more accurately detect the illegal use of a logo that is used in variously transformed forms. In addition, since illegal use information on logo text can be considered in addition to a logo image, it is possible to further increase the accuracy of illegal use detection.

The technical effects of the present disclosure are not limited to the above-described effects, and other effects that are not described may be obviously understood by those skilled in the art from the following description.

Hereinabove, although embodiments of the present disclosure have been described in detail, the scope of rights according to the present disclosure is not limited thereto, and various modifications and improvements made by those skilled in the art using the basic concept of the present disclosure described in the following claims should also be interpreted as being included in the scope of rights according to the present disclosure.

What is claimed is:

1. A brand logo illegal use detection method comprising:

acquiring a logo image and logo text that are targets of illegal use detection;

generating image illegal use information indicating whether an illegal use suspect image in which a logo is suspected to be illegally used includes the logo image by using a logo identification model;

performing text analysis on the illegal use suspect image and generating text illegal use information indicating whether the logo text is illegally used; and generating illegal use detection information on the illegal use suspect image based on the image illegal use information and the text illegal use information, wherein the image illegal use information includes a probability that the illegal use suspect image includes the logo image, and the text illegal use information includes a probability that the illegal use suspect image includes the logo text, and wherein the generating of the text illegal use information comprises:

identifying surrounding text present around the illegal use suspect image and internal text present inside the illegal use suspect image in an online shopping mall or a phishing site, and calculating the probability that the illegal use suspect image includes the logo text based on a similarity discrimination result between the surrounding text and the logo text and a similarity discrimination result between the internal text and the logo text.

2. The brand logo illegal use detection method of claim 1, further comprising:

prior to the generating of the image illegal use information, generating logo transformation images including transformed forms of the logo image to generate a machine learning dataset; and performing learning based on the machine learning dataset to generate the logo identification model.

3. The brand logo illegal use detection method of claim 2, wherein the generating of the machine learning dataset comprises:

generating the transformed forms based on at least one of rotation, transition, enlargement, reduction, proportion change, color change, brightness adjustment, transparency adjustment, and partial removal of the logo image; and applying a plurality of background images to the transformed forms to generate the logo transformation images.

4. The brand logo illegal use detection method of claim 3, wherein the generating of the machine learning dataset further comprises adding noise text and a noise image to the logo transformation images.

5. The brand logo illegal use detection method of claim 3, wherein the illegal use suspect image includes a product description image uploaded to the online shopping mall or a phishing image uploaded to the phishing site.

6. The brand logo illegal use detection method of claim 3, wherein the plurality of background images include a plurality of product description images uploaded to an online shopping mall and a plurality of public institution images used as a public institution description material.

7. The brand logo illegal use detection method of claim 1, wherein the generating of the text illegal use information comprises:

performing optical character recognition (OCR) on the illegal use suspect image to extract illegal use suspect text.

8. The brand logo illegal use detection method of claim 7, wherein the generating of the text illegal use information comprises:

when the illegal use suspect text is not extracted through the OCR, estimating that the illegal use suspect image includes a designed text; and calculating a similarity between the designed text and the logo image using the logo identification model to calculate the probability that the illegal use suspect image includes the logo text.

9. A brand logo illegal use detection method comprising:

acquiring a logo image and logo text that are targets of illegal use detection;

generating image illegal use information indicating whether an illegal use suspect image in which a logo is suspected to be illegally used includes the logo image by using a logo identification model;

performing text analysis on the illegal use suspect image and generating text illegal use information indicating whether the logo text is illegally used; and generating illegal use detection information on the illegal use suspect image based on the image illegal use information and the text illegal use information, wherein the image illegal use information includes a probability that the illegal use suspect image includes the logo image, and the text illegal use information includes a probability that the illegal use suspect image includes the logo text, and wherein the generating of the text illegal use information comprises:

identifying surrounding text present around the illegal use suspect image and internal text present inside the illegal use suspect image in an online shopping mall or a phishing site, querying texts associated with the logo text from an associated text pool of the logo, and calculating the probability that the illegal use suspect image includes the logo text based on similarity discrimination results between each of the associated texts and the surrounding text and similarity discrimination results between each of the associated texts and the internal text.

10. A non-transitory computer-readable recording medium on which a computer program to be executed by at least one processor is recorded, wherein the computer program includes instructions for:

analyzing a brand logo that is a target of illegal use detection to extract a logo image and logo text;

generating logo transformation images including transformed forms of the logo image to generate a machine learning dataset;

performing learning based on the machine learning dataset to generate a logo identification model;

generating image illegal use information indicating whether an illegal use suspect image in which the brand logo is suspected to be illegally used includes the logo image by using the logo identification model;

performing text analysis on the illegal use suspect image and generating text illegal use information indicating whether the logo text is illegally used; and generating illegal use detection information on the illegal use suspect image based on the image illegal use information and the text illegal use information, wherein the image illegal use information includes a probability that the illegal use suspect image includes the logo image, and the text illegal use information includes a probability that the illegal use suspect image includes the logo text, and wherein the generating of the text illegal use information comprises;

identifying surrounding text present around the illegal use suspect image and internal text present inside the illegal use suspect image in an online shopping mall or a phishing site, and calculating the probability that the illegal use suspect image includes the logo text based on a similarity discrimination result between the surrounding text and the logo text and a similarity discrimination result between the internal text and the logo text.

11. A brand logo illegal use detection device comprising:

a memory configured to store instructions; and a processor configured to execute the instructions to:

analyze a brand logo that is a target of illegal use detection to extract a logo image and logo text;

generate image illegal use information indicating whether an illegal use suspect image in which the brand logo is suspected to be illegally used includes the logo image by using a logo identification model;

perform text analysis on the illegal use suspect image and generate text illegal use information indicating whether the logo text is illegally used; and generate illegal use detection information on the illegal use suspect image based on the image illegal use information and the text illegal use information, wherein the image illegal use information includes a probability that the illegal use suspect image includes the logo image, and the text illegal use information includes a probability that the illegal use suspect image includes the logo text, and wherein the generating of the text illegal use information comprises:

identifying surrounding text present around the illegal use suspect image and internal text present inside the illegal use suspect image in an online shopping mall or a phishing site, and calculating the probability that the illegal use suspect image includes the logo text based on a similarity discrimination result between the surrounding text and the logo text and a similarity discrimination result between the internal text and the logo text.

* * * * *